Oct. 9, 1934.  O. B. BENSON  1,975,892
METHOD AND APPARATUS FOR CONTROLLING STORAGE BATTERIES
Filed March 7, 1934
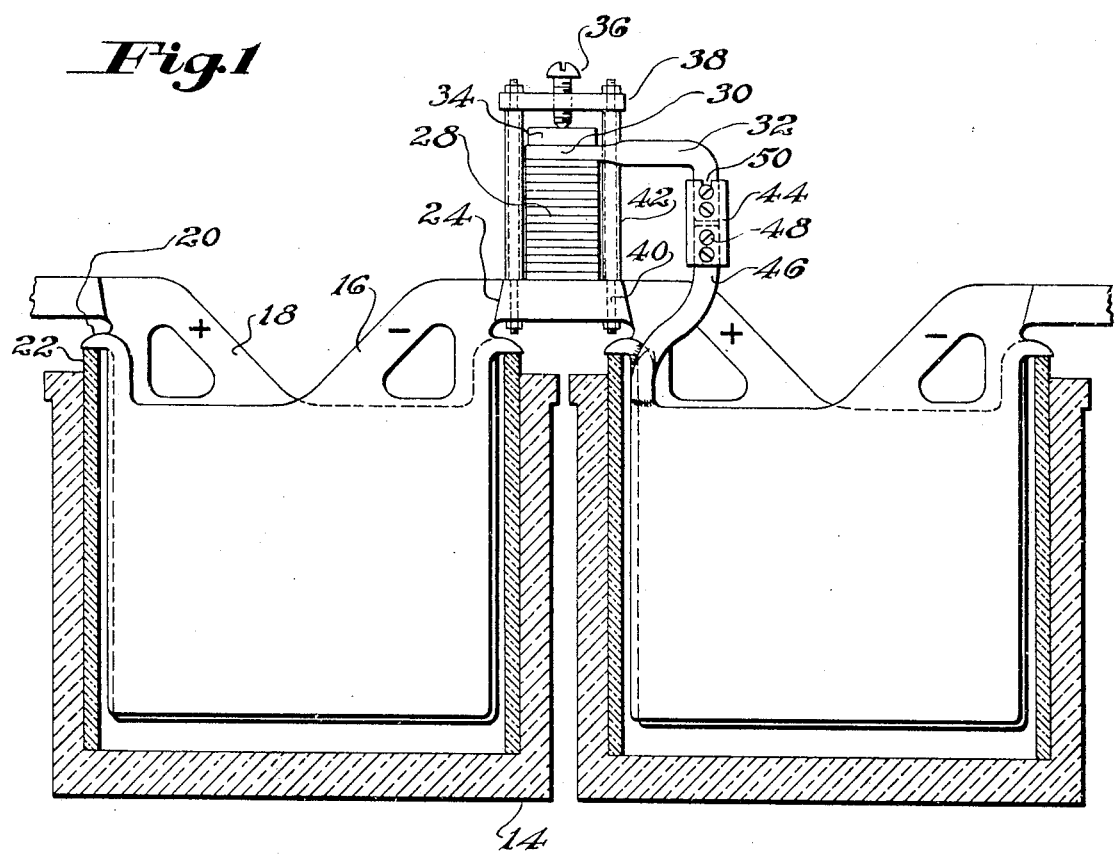
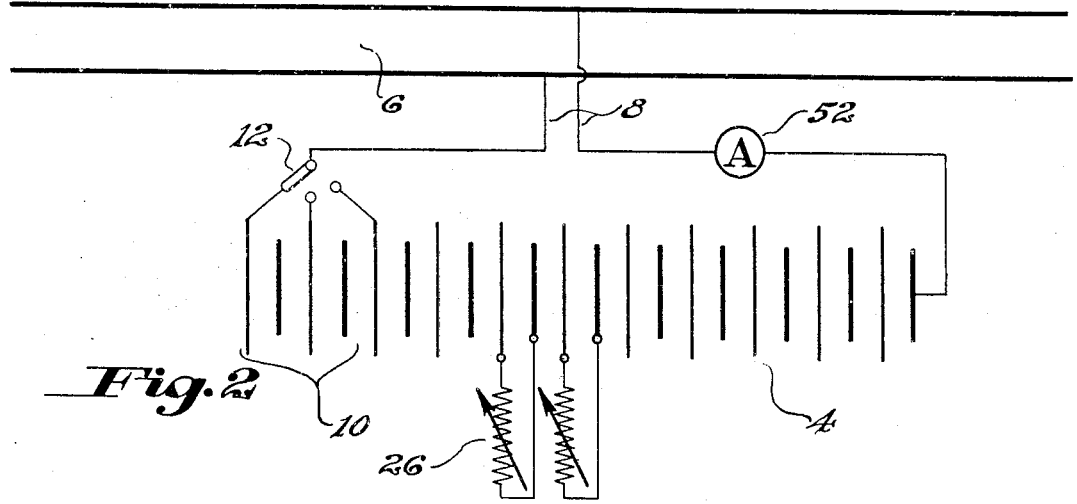
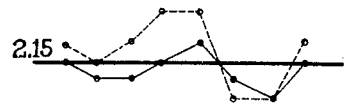

Patented Oct. 9, 1934

1,975,892

UNITED STATES PATENT OFFICE 1,975,892

METHOD AND APPARATUS FOR CONTROLLING STORAGE BATTERIES

Oscar B. Benson, Watertown, Mass.

Application March 7, 1934, Serial No. 714,431

16 Claims. (Cl. 171—314)

The present invention relates to methods and apparatus for controlling the float charge of series connected storage batteries.

In direct current distribution systems which employ storage batteries "floating" on the line, it is customary to supply to the batteries a continuous float charge to maintain them in fully charged condition in readiness for emergency use. Such batteries ordinarily comprise series connected individual cells in sufficient number to give the required line voltage of the system. Owing to natural deterioration, cells are being continually replaced and as a consequence, a complete battery may be made up of cells of widely different ages. The float charge is required to overcome the local action which tends to take place continuously in any lead cell and since the local action increases with the age of the plates, the charge current must be maintained at a value sufficient to keep the oldest cells in condition. Owing to the series connection, the same float charge current normally flows through all the cells. For newer and more efficient cells in which the local action is small as compared with that of the less efficient cells, the maximum charge current is not necessary and in fact it has deleterious effects in prematurely ageing such cells.

The object of the present invention is to provide a method and apparatus for controlling the net float charge currents supplied to the different cells whereby each cell is required to take only the current necessary for maintaining it in proper condition without excessive overcharge.

With this object in view, the principal feature of the invention comprises a method and apparatus whereby there is supplied to the battery a float charge current adequate for the oldest and least efficient cells and whereby the excess of current above that necessary for maintaining the newer cells in condition is shunted around them. Accordingly, each cell in the battery is required to take only the proper amount of current for maintaining the proper charged condition without detrimental overcharge.

Other features of the invention comprise certain novel modes of operation and features of construction hereinafter described and particularly defined in the claims.

In the accompanying drawing, Fig. 1 is a sectional elevation of two adjacent cells provided with the preferred form of apparatus according to the present invention; Fig. 2 is a diagram of the battery and associated control apparatus; and Fig. 3 is a graph illustrating the method of determining the shunt adjustment.

In the customary direct current feeder system, a battery shown at 4 in Fig. 2 and consisting of a large number of series connected cells is connected across the station bus 6 by leads 8. In order to maintain the float current fairly constant, regardless of variations in the bus voltage, a set of end cells 10 is adapted to be selectively cut into service by means of the end cell switch 12 of any suitable form.

The cells are of the form indicated in Fig. 1, each comprising a tank 14 and sets of negative and positive plates 16 and 18 respectively, each plate having hooks 20 resting on supports 22 of glass or a suitable insulating material. The cells are permanently connected in series by a bridge or bus 24 burned to the positive plates of one cell and the negative plates of the next adjacent cell.

The apparatus thus far described is common to all types of direct current systems with floating storage batteries. In order to permit control charging of the different cells in accordance with their age, the newer and more efficient cells are provided with adjustable shunts indicated generally at 26. No particular form of shunt is required except that it should be of a material unaffected by the fumes of the battery room and to this end a carbon pile resistor is preferred. As shown in Fig. 1, the resistor comprises a pile of carbon blocks 28 resting on the top of the bridge 24 which forms the connection to the positive terminal of the cell shown at the right-hand side of Fig. 1. On the top of the pile rests a lead plate 30 formed on the end of a lead cable 32. Pressure is applied to the blocks to vary the resistance thereof by an insulating plate 34 engaged by an adjustable screw 36 held in a frame attached to the bridge 24. The frame comprises simply an upper plate 38 secured above the bridge by bolts 40 which are covered with insulating sleeves 42 to prevent contact of the carbon blocks therewith. The cable 32 connects through a coupling 44 with a lead cable 46 which is burned to the upper part of the outermost negative plate of the cell. It will be seen, therefore, that a part of the charging current which would normally flow from the bridge 24 to the positive plate and through the electrolyte to the negative plate is by-passed through the carbon pile and the cables 32 and 46 directly to the negative plate.

It is occasionally desirable, for reasons which will hereinafter be made apparent, to determine the current diverted by the shunt of any cell. To this end, the coupling member 44 comprises a sleeve having a number of set screws 48 to engage the ends of the cables 32 and 46. The upper end of the coupling is slotted, as indicated at 50, to permit the uppermost set screw to be pulled out with the cable 32. To measure the shunt current, an ammeter is clipped between one of the lower set screws and the uppermost set screw, the two upper screws are then loosened to free them from the cable 32, and then the cable is pulled up from the coupling, thereby permitting the ammeter to show a reading. It will be observed that since the ammeter is connected prior to separation of the cables, there is no possibility of an arc on separation of the cables as the circuit remains closed through the ammeter, an important factor in a battery room where the atmosphere may contain explosive gaseous mixtures.

Although Fig. 2 shows controlling shunts applied only to two of the cells, it will be understood that shunts may be applied to all of the cells, whereby proper adjustment of the charging current may be effected from the time a cell is put into service until it is finally discarded. It will also be understood that a single shunt may be connected across two or more adjacent cells of substantially identical characteristics.

The preferred method of arriving at the best adjustments of the shunts will now be described. If the battery is connected across a source of substantially constant voltage, the procedure is quite simple. It has been found that for any given cell, there is a single best value of terminal voltage which corresponds to the approximate float current just required for maintaining the battery in condition without overcharge. In the following discussion, it will be assumed that the cells are of a type requiring a terminal voltage of 2.15 volts for new cells having a full charge gravity of 1.210, although, of course, this voltage value will vary for cells of different manufacture. If a constant potential difference of 2.15 volts is maintained across each cell over a long period, the float current will at all times be proper for maintaining the necessary charged condition of the battery. As a cell ages, the optimum potential difference drops slightly owing to the diminished E. M. F. of the cell, but for a battery having no very old cells, the constant value of 2.15 volts per cell may be considered the best value. With the constant bus voltage, the number of cells in service is adjusted so that the bus voltage divided by the number of cells is as nearly as possible 2.15 volts per cell. The shunts of the newer cells are then adjusted to divert a sufficient amount of current so that the terminal voltage on each of such newer cells is approximately 2.15 volts. Although the total float current may, in a given instance, be, say, 50 amperes, the net float current through a new cell may be between 20 and 30 amperes, which is sufficient for such a cell because of its smaller local action.

If the shunts of the present invention were not applied, the same float current would flow through all cells and the terminal voltage of the newer cells might be as high as 2.25 volts, indicating excessive float current and consequent destructive action on the cell.

On a bus with a fluctuation voltage, the problem of arriving at the correct adjustment is somewhat more difficult. Even with the balancing effect of the end cells, a fluctuation of several hudredths of a volt per cell can easily occur. In such a case, it is necessary to adjust for the average over a period and by a series of empirical checks to arrive at the shunt setting which most nearly gives the required average float current to maintain the cell in proper condition. According to this procedure, curves are charted showing variations of bus voltage and variations of cell voltage with respect to time. Such curves are shown in Fig. 3 with points taken at approximately half hour intervals. This bus voltage is plotted in full lines as volts per cell, namely, the total bus voltage divided by the number of cells in service at the time of measurement. In dotted lines is plotted a typical terminal voltage graph of a new cell with approximately the proper shunt adjustment. It will be noted that the time during which the terminal voltage of the cell is in excess of 2.15 is at least partially compensated by a voltage less than 2.15 for another part of the interval. If the actual plotted graph of cell voltage were higher than that indicated, the shunt would be set to divert more current and thereby to lower the curve somewhat.

In adjusting by the average method above described, it is sufficient, as a practical matter, to set the shunt so that the cell voltage curve does not vary greatly from the bus voltage curve. A more exact average can be found by integrating the curves but this is in practice an unnecessary refinement, because the cell voltage does not precisely follow changes in the float current, owing to a time lag introduced by internal reactions in the cell. Furthermore, to be strictly accurate, the average should be determined for the float current and not for the terminal voltage; adjusting for an average of voltage does not insure that the average float current is of exactly the proper value because there is not a straight line relation between current and terminal voltage. For these reasons, it will be seen that nicety of adjustment is not essential, it being necessary only to adjust for an approximate average of cell voltage on the newer cells, as indicated by Fig. 3. It will be appreciated that a slight excess of float current is not harmful except as it contributes to the ageing of the cell; a deficiency, however, will result in failure to keep the cell charged, but such deficiency is quickly reflected in a lowering of terminal voltage and can be detected if occasional check graphs are made.

The provision for current measurement through the separable coupling 44 affords a means of effecting a quick tentative adjustment of the shunt. For example, when a new cell is cut into service, experience may show that the required average float current for cells of similar manufacture is in the neighborhood of 30 amperes, as contrasted with 50 amperes for the older cells. Immediately after installation, the shunt may be adjusted to indicate a diverted current of 20 amperes. Subsequent more exact adjustments may be made by comparative voltage graphs of the type shown in Fig. 3. Thereafter, occasional check graphs may be made to determine whether the float current is proper for maintaining the cell in condition.

It will be seen that any shunt diverts a substantially constant current, the shunt current being proportianal to the terminal voltage of the cell which, in normal operation, does not vary more than a few hundredths of a volt. The actual float current through a shunted cell, however, varies considerably with a slight change of voltage. If desired, the actual float current through any cell may be determined by subtracting the shunt current from the total current delivered to the battery as measured by an ammeter 52 in one of the lines 8.

The initial adjustments of the shunts having been made as above described, alterations are unnecessary over fairly long periods. Some change is necessary between summer and winter, if the temperature of the battery room varies widely. For example, in winter, the average float current for an old cell may be in the neighborhood of 50 amperes and the desired current for a new cell in the neighborhood of 20 amperes. In summer, the local action increases considerably so that the total float current taken by the battery may rise to 100 amperes, the terminal voltages remaining approximately the same. Since the shunt on the new cell diverts a substantially constant current (30 amperes in the example given), it will be seen that the new cells would take a float current far in excess of their requirements. Some tightening of the shunts is therefore necessary to divert a greater proportion of the current. The readjustment of the shunts is determined by preparing new graphs of the type indicated in Fig. 3. Furthermore, some adjustment from time to time is obviously necessary as the cells become older, to increase the float current and thereby to compensate for the naturally increased local action. Such changes in the adjustments of the shunts to meet changed conditions are equally necessary for a battery which is connected to a constant voltage and for a battery connected to a fluctuating bus. In any event, the proper shunt adjustments may be maintained with sufficient accuracy by periodic comparisons of cell voltage with the bus voltage, as illustrated by the graph of Fig. 3.

The shunts have no appreciable effect on the battery during discharge. A cell of the size referred to may discharge, under emergency conditions, at a rate of several thousand amperes, and the small current diverted by any of the shunts is of no consequence. Similarly, if the battery is charged at a high rate, as is necessary after a discharge, the proportion of current taken by the shunts is negligible.

It will be seen that although the energy taken by the shunts during normal floating is wasted, such energy would also be wasted if passed through the cells and would furthermore have a positively detrimental action on the cells.

Although the preferred embodiment of the present invention has been described, the invention is not limited to such preferred embodiment, but may be varied within the scope of the appended claims.

Having thus described the invention, what is claimed is:

1. The method of controlling the float charge of storage battery cells of different ages and conditions and series connected across a supply line which consists in supplying a float charge current sufficient to maintain the oldest cells in charged condition, and shunting around the newer cells an excess of current above that necessary to maintain said cells in proper charged condition.

2. The method of controlling the float charge of storage battery cells of different ages and conditions and series connected across a supply line which consists in supplying a float charge current sufficient to maintain the oldest cells in charged condition, and shunting sufficient current around the newer cells to diminish the terminal voltages of such cells to values approximating the terminal voltages of the older cells.

3. The method of controlling the float charge of storage battery cells of different ages and conditions and series connected across a supply line which consists in supplying a float charge current sufficient to maintain the oldest cells in charged condition, and shunting sufficient current around the newer cells to prevent passage through said cells of current greatly in excess of that required to maintain the cells in charged condition.

4. The method of controlling the float charge of storage battery cells of different ages and conditions and series connected across a supply line which consists in supplying a float charge current sufficient to maintain the oldest cells in charged condition, and shunting each of the newer cells with a substantially constant resistance to limit the current through said cells.

5. The method of controlling the float charge of storage battery cells of different ages and conditions and series connected across a supply line of fluctuating voltage which consists in supplying a float charge current sufficient for the older cells, and shunting current around the newer cells to maintain the average terminal voltage of said cells at a value approximately corresponding to that voltage most satisfactory for float charging without excessive overcharge.

6. The method of controlling the float charge of storage battery cells of different ages and conditions and series connected across a supply line of fluctuating voltage which consists in supplying a float charge current sufficient for the older cells, and shunting around the newer cells a substantially constant current sufficient to maintain the average terminal voltages of such cells at values not excessively greater than the average value of the supply voltage per cell.

7. A float battery system comprising a bus, a battery of series connected cells floating on the bus, the cells being of different ages and conditions, and shunts connected around less than all of the cells to divert float current therefrom.

8. A float battery system comprising a bus, a battery of series connected cells floating on the bus, the cells being of different ages and conditions, and adjustable carbon pile resistors connected around newer and more efficient cells to divert a part of the float current therefrom.

9. A float battery system comprising a bus, a battery of series connected cells floating on the bus, the cells being of different ages and conditions, bridges connecting plates of adjacent cells to form the series connections therefor, a pile of carbon resistance blocks on at least one of the bridges, a frame for supporting the blocks, and a cable connection from the top of the pile to a battery plate of polarity opposite to that to which the bridge is connected.

10. A float battery system comprising a bus, a battery of series connected cells floating on the bus, the cells being of different ages and conditions, a shunt for at least one of the cells, a connection from the shunt to one side of the cell including two cables, a separable coupling member for the cables, and means for connecting a meter between the cables prior to separation thereof.

11. A float battery system comprising a bus, a battery of series connected cells floating on the bus, the cells being of different ages and conditions, a shunt for at least one of the cells, a connection from the shunt to one side of the cell including two cables, a coupling sleeve, and set screws connecting the sleeve to the cables, the sleeve having a slot to permit disengagement of one of the screws therefrom when one of the cables is pulled from the sleeve, the screws serving as terminals to which an ammeter may be attached.

12. The method of controlling the float charge of series connected storage battery cells of different conditions which consists in supplying a total float charge current sufficient to maintain in condition those cells requiring the maximum charge, and shunting around those cells requiring less than said total current a portion of the current above that necessary for said cells.

13. The method of controlling the float charge of series connected storage battery cells of different conditions which consists in supplying a total float charge current sufficient to maintain in condition those cells requiring the maximum charge, and shunting around those cells requiring less than said total current a sufficient portion of the current to make the terminal voltages of all cells substantially equal.

14. The method of controlling the float charge of storage battery cells of different conditions and series connected across a supply of fluctuating voltage which consists in supplying a float charge current sufficient for those cells requiring the maximum charge, and shunting around the more efficient cells sufficient current to maintain the average terminal voltage across all cells at approximately the same value.

15. The method of controlling the float charge of storage battery cells of different conditions and series connected across a supply of fluctuating voltage which consists in supplying a float charge current sufficient for those cells requiring the maximum charge, and shunting around the more efficient cells sufficient current to maintain the average terminal voltage of said cells at approximately the value corresponding to the optimum voltage for float charging without excessive overcharge.

16. A float battery system comprising a bus, a battery of series-connected cells floating on the bus, the cells being of different ages and conditions, and individual shunts connected around the more efficient cells to divert float current therefrom.

OSCAR B. BENSON.